Feb. 7, 1933.   O. B. ANDREWS   1,896,603
BREAD BAND
Filed March 2, 1932
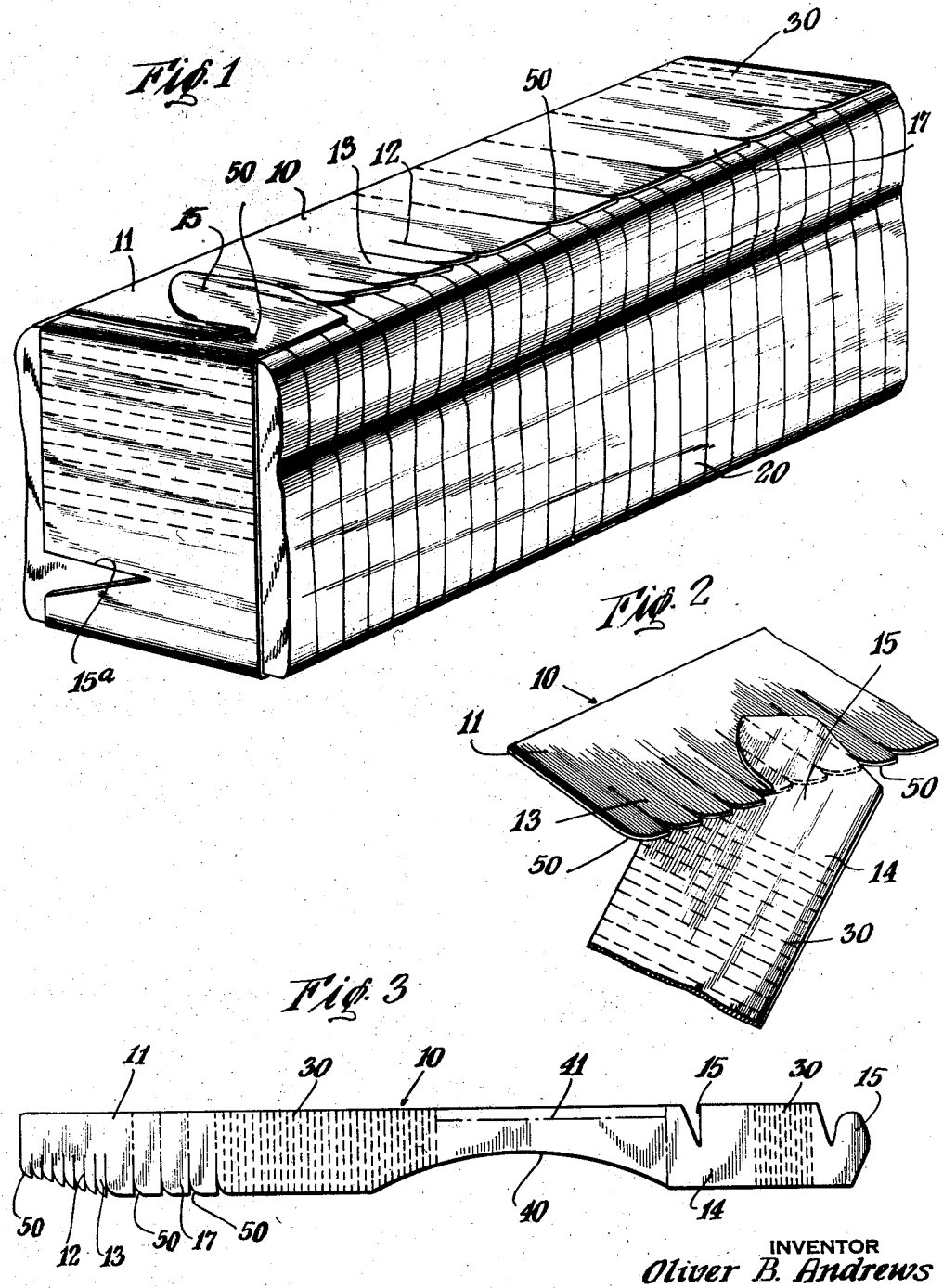
INVENTOR
Oliver B. Andrews
BY
Austin + Dix
ATTORNEY Patented Feb. 7, 1933

1,896,603

UNITED STATES PATENT OFFICE

OLIVER B. ANDREWS, OF CHATTANOOGA, TENNESSEE

BREAD BAND

Application filed March 2, 1932. Serial No. 596,259.

This invention relates to bread bands for retaining sliced loaves of bread in their original form and more particularly to an improved adjustable band which is adapted to extend around a loaf of sliced bread and which may be quickly and accurately joined at the ends for holding the sliced loaf or such slices as remain of the sliced loaf in their original relative positions. This application is a continuation in part of my application, Serial No. 568,893, filed October 15, 1931.

In the improved bread band of the present invention, means are provided for adjusting the band to fit loaves of various sizes and to fit partial loaves after some slices have been removed, so that the remaining slices will be held in firm, compact position.

An object of this invention is to provide an improved band which is particularly adapted for rapid adjustment whether by machine or by hand.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which Fig. 1 is a perspective view of a loaf of sliced bread showing the improved band in place;

Fig. 2 is a perspective view showing the method of joining the ends of the band; and Fig. 3 is a perspective view of the bread band in extended position.

Like reference characters denote like parts in the several figures of the drawing.

In the following description and in the claims, various details will be identified by specific names for convenience, but they are intended to be as generic in their application as the art will permit.

Referring to the drawing more in detail, the invention is shown as applied to a band 10 adapted to encircle a loaf 20 of sliced bread. The band 10 is shown in detail in Fig. 3 and comprises, generally, a long strip of paper or fibreboard provided at one end 11 with a plurality of slots 12 which form tongues 13 therebetween. The other end 14 is provided with a hook portion 15 adapted to interlockingly engage with any one of the tongues 12 when the band is wrapped around a sliced loaf. An auxiliary hook portion 15a is formed in the end section 14 to permit a desired adjustability as the loaf is used up. Score lines 30 are provided, at the end 14 and at the intermediate portion of the band, to permit the band to snugly fit the loaf. Tabs 17 are formed in the end 11 between the body of the band and the tongues 13. An arcuate cutout portion 40 may be provided longitudinally of the main portion of the band. The foregoing description comprises the general features of my bread band as more particularly disclosed and claimed in my application, Serial No. 568,893, filed October 15, 1931.

The present invention is essentially an improvement upon this construction. In general, the present invention is more particularly concerned with the provision of arcuate edge portions 50 formed on the tabs and tongues 13 and 17 respectively. As described and disclosed in the claims of the above identified application, the tabs and tongues are substantially angular in configuration and require careful adjustment of the cooperating hook members at the other end of the band. By the improvements of the present invention, that is by rounding off the ends of the members 13 and 17 to form arcuate portions 50, the hook or tab member 15 may be readily and accurately slid into position, permitting a rapid and accurate hooking engagement between the hook portion 15 and the tongues 13. This hooking operation may be rapidly performed initially by machinery at the bakery and by the housewife during the use of the loaf. In every instance, a rapid and positive locking engagement is permitted without involving the tearing of the tabs or occasioning more than one attempt to effect engagement due to the difficulty in adjusting the cooperating elements as occurs with prior constructions.

The features just disclosed are of particular importance in connection with the use of a bread band having an arcuate tensioning cutout portion 40 with or without a stiffening rib 41, as disclosed in my application above referred to. With my novel hooking arrangement, in connection with this type of bread band, greater tension may be applied thereto, particularly when applied by machinery, due to the facile engagement of the hooks 15 or 15a with any of the tongues 13 or 17, resulting from the fact that the hook members are adapted to slide on and over the arcuate portions 50 of the tongues and be quickly and rapidly locked in position.

As noted previously, my improved adjustable band is also adapted to the packaging of other bakery products such as rolls, cakes and cookies, and the application of the improved bread band is not limited to sliced bread alone.

It will now be appreciated that there has been provided an improved, flexible bread band for use in packaging sliced loaves of bread, and baking products, which band is particularly adapted for use with automatic machines in that, by the application of the improvements of the present invention, rapid and facile engagement of the locking members is permitted.

While certain novel features of the invention have been disclosed and are pointed out in the annexed claims, it will be understood that various omissions, substitutions and changes may be made by those skilled in the art without departing from the spirit of the invention.

What I claim is:

1. An improved bread band for sliced bread and the like, including, a band having a plurality of slots at one end thereof forming tongues therebetween, hooked portions at the other end of said band adapted to adjustably engage said tongues, said tongues being of progressively decreasing length, and arcuate guide portions formed on the end of said tongues to facilitate interlocking engagement with said hook portions.

2. An improved bread band for sliced bread and the like, including, a band having a plurality of slots at one end thereof forming tongues therebetween, hooked portions at the other end of said band adapted to adjustably engage said tongues and arcuate guide portions formed on the end of said tongues to facilitate interlocking engagement with said hook portions.

In testimony whereof I have hereunto set my hand.

OLIVER B. ANDREWS.